United States Patent

[11] 3,562,569

| [72] | Inventor | Paul Koechlin |
| | | Belfort, France |
| [21] | Appl. No. | 772,334 |
| [22] | Filed | Oct. 31, 1968 |
| [45] | Patented | Feb. 9, 1971 |
| [73] | Assignee | UNELEC |
| | | Paris, France |
| | | a business firm under French law |
| [32] | Priority | Nov. 3, 1967 |
| [33] | | France |
| [31] | | 2,777 |

[54] DYNAMO-ELECTRIC MACHINES HAVING VACUUM CAST WINDING INSULATION
2 Claims, 7 Drawing Figs.

[52] U.S. Cl............................................ 310/214, 310/211
[51] Int. Cl............................................ H02k 3/48
[50] Field of Search............................................ 310/214, 215, 216, 201, 203, 200, 195, 43, 261, 211

[56] References Cited
UNITED STATES PATENTS

| 570,424 | 10/1896 | Brinkman...................... | 310/203 |
| 2,400,576 | 5/1946 | Sigmund....................... | 310/215 |
| 2,648,018 | 8/1953 | Meier............................ | 310/43 |
| 2,781,465 | 2/1957 | Schuff........................... | 310/214 |
| 3,291,056 | 12/1966 | Steinman...................... | 310/214 |
| 3,330,977 | 7/1967 | Balke............................ | 310/214 |

Primary Examiner—Milton O. Hirshfield
Assistant Examiner—R. Skudy
Attorney—Flynn and Frishauf ABSTRACT: A rotor structure having a thin jacket of closely wrapped nonmagnetic strandlike material, such as fiberglass tape, nonmagnetic steel wires, fiber strands, or the like are wrapped around the rotor structure, the closely wrapped material being impregnated with the insulating material in hardened condition, so that, during manufacture, the wrapping may serve as a mold for vacuum casting of liquid insulation to fill all interstitial spaces between the windings.

Paul KOECHLIN, Inventor
by Stephen H. Frishauf
Atty 3,562,569

DYNAMO-ELECTRIC MACHINES HAVING VACUUM CAST WINDING INSULATION

The present invention relates to dynamo-electric machines, and more particularly to the method, and resulting machine structure, of insulating the windings in the rotors of dynamo-electric machines.

In the manufacture of rotors of dynamo-electric machines it is frequently necessary to protect the windings from contact with the magnetic structure, and more particularly the magnetic laminations, or other metal parts. Particularly when machines are constructed which are entirely enclosed and have internal ventilation, carbon, dust, and other conductive particles which occur due to wear and tear of brushes on the collectors, or slip rings, frequently decrease the resistance of the insulation of the windings, thus providing leakage current paths, or contributing to flashovers. Further, humidity, condensation due to moisture or penetration of water may likewise decrease the effectiveness of insulation. In order to overcome these difficulties, it has previously been proposed to saturate the windings, and the entire core structure with synthetic varnishes, for example thermosetting plastics. In order to further improve the insulation effectiveness and the protection against contamination, interstitial spaces which remain are filled by mastic. In spite of precautions, it is not always possible in ensure perfect tightness and seal against moisture or contaminants particularly in the critical zone where the various turns of the windings are connected to the commutator, or slip rings of the machines respectively.

The effectiveness of insulation can further be improved by casting or injecting thermosetting synthetic plastics under vacuum. Such vacuum injection processes insure a practically perfect tightness and protection of the windings from contamination. It has been found that it is not even necessary to separately insulate the conductors from each other, or with respect to the metallic parts of the magnetic circuit, for example the rotor structure, particularly where the conductors are located within the slots, with insulators having high electrical and mechanical strength. One may utilize porous insulators, such as fabric, felt, or tapes of synthetic fibers Thereafter, thermosetting plastics injected under vacuum will impregnate the tissues, felts or tapes and, after setting, will provide the necessary electrical, mechanical and thermal qualities to the insulating materials, which are necessary to provide for the rated and effective functioning of the machine. This system further improves the cooling of the copper conductors because an even temperature distribution along the windings can be obtained.

Difficulty has been experienced in the vacuum injection process when applied to dynamo-electric machines, and particularly to dynamo-electric machine rotors, because a tight mold is necessary, which is inherently expensive, and which has to be assembled each time for each rotor to be insulated, and newly sealed.

It is an object of the present invention to improve the manufacturing step of injecting insulation material under vacuum when insulating windings of dynamo-electric machines.

SUBJECT MATTER OF THE PRESENT INVENTION

Rather than using a separate mold, in which the part to be insulated, for example the rotor, is introduced, the mold for vacuum injection of resin is formed by jackets mounted on the structure to be insulated itself, and which is left after the insulation material has set or hardened; such a jacket is preferably formed as a collar, or loop or binding additionally mechanically maintaining the windings in position.

In accordance with a feature of the invention, the jacket is formed of glass fibers in form of parallel windings, or tapes, or sheets and maintained in place by a synthetic resin; in accordance with another feature, nonmagnetic steel wire may be used. Vacuum tightness is then assured by an additional, thin adhesive tape or band.

The structure, organization and operation of the invention will now be described more specifically in the following detailed description with reference to the accompanying drawings, wherein.

Figure 1:
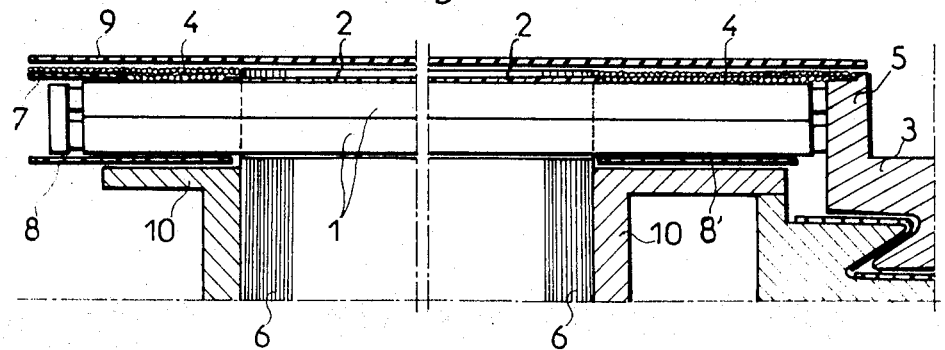
FIG. 1 illustrates, in schematic form, a partial longitudinal cross-sectional view of a rotor of a direct current dynamo-electric machine, in which the collar, or jacket is formed of nonmagnetic steel wire.

The winding 1 of a direct current machine is held within the slots of the magnetic structure by an insulating strip 2, as well known in the art. Collector side 3, as well as the other side, is covered and maintained in place by a jacket or collar 4, formed of nonmagnetic steel wire. Collar 4 is formed of adjacently wrapped windings of the wire, extending over towards the end spur 5 of commutator 3 on the one side, and up to the magnetic circuit 6 on the other. At the other end of the rotor, that is the left side in FIG. 1, further adjacent windings of wire 4 are placed, starting from the end of the magnetic circuit 6 and extending just beyond the final end of the coils of the machine. An insulating ribbon or tape 7 is preferably interposed between the winding 1, and the steel wires 4. Similar windings of insulating tape, 8, 8′, are placed internally of the power windings 1, to provide for insulation with respect to the support ends of the magnetic circuit, shown at 10, 10′ in FIG. 1. The bands or tapes 7, 8 themselves form the opening of the mold through which the liquid, flowable resin is introduced. To provide for tightness of the layer 4, a thin, adhesive ribbon 9 is wrapped around the outside of the assembly, covering the entire rotor structure. The tightness of the interior of the winding is automatically ensured by the locking of the magnetic structure of the laminations 6 towards each other as is well known in the art, that is by the compression of the laminations between end pieces 10.

At the commutator side, that is on the right-hand side of FIG. 1, the spur end 5 of the commutator (or, in case of asynchronous machines, of the slip rings) provides an end stop against which jacket 4 can be placed. In case of an asynchronous machine, also, the mold can be closed at the right-hand side (FIG. 1) by an insulating disc, by a metallic disc provided with insulating material or, in its easiest form, by the drum or other structural element which supports the slip rings of the machine.

Rather than using wrappings of steel wire for the jacket, a tape of glass fibers, a glass fiber sheet, or glass fiber thread, wrapped closely and maintained in position by polymerized synthetic resin can be used. Such tape or filament is readily available in commercial channels, and provides a mechanically strong collar, just as sturdy as nonmagnetic steel wire, with the additional advantage of being an insulator and easily sealed to form a jacket which, inherently, also forms the outer part of a casting mold for vacuum injection.

Figure 2:
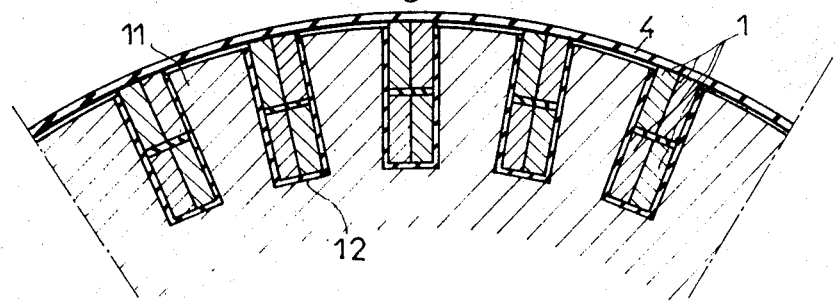
FIG. 2 is a transverse cross-sectional view, in part, of a rotor of a direct current dynamo-electric machine, utilizing a jacket of insulating material.
Figure 3:
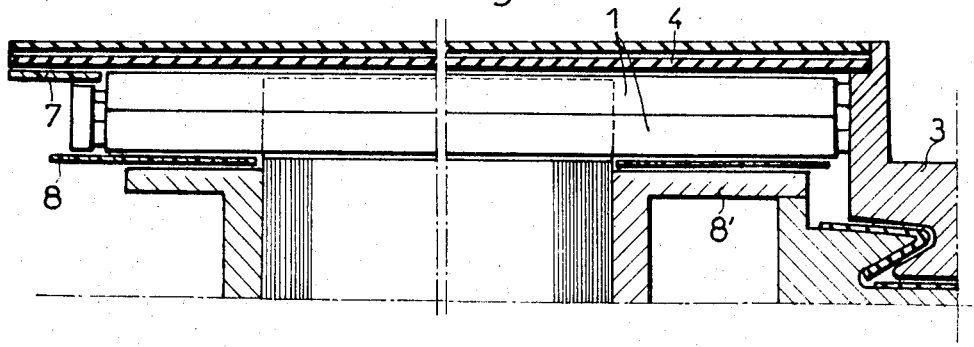
FIG. 3 is a longitudinal, partial view of the rotor of FIG. 2.

Referring to FIG. 2, a group of laminations 11 are formed with slots 12, in the interior of which the windings 1 of the coils are placed. Conductors 1 are held in position by the insulating jacket 4′ placed over the entire length of the rotor, also covering the magnetic structure thereof. This is best seen in FIG. 3 in longitudinal view. Jacket 4′ extends over the entire length of conductors 1. As in the example described in connection with FIG. 1, two rigid insulating bands 7, and 8, form the opening of the molds for introduction of liquid insulator.

Forming the ring about the rotor as illustrated in FIGS. 2 and 3 provides for a tight outer jacket and mold housing extending over the entire length of the rotor. Additionally, since the end shims to hold the windings within the slots of the rotor may be omitted, the diameter of the rotor and the height of the teeth thereof can be reduced, thus resulting in a structure of lower weight and lower construction cost. Reduction in length of the teeth further decreases stray inductances due to the slots, thus decreasing the reactive impedance, and the potential occuring as a consequence thereof, and thus in DC machines improve commutation.

The insulation itself may be introduced under vacuum as a thermosetting resin without solvent, and provide total environmental protection of the windings. Such thermosetting resin requires that, at injection temperature, it is of sufficiently low viscosity in order to completely impregnate the insulation already present and to completely fill all interstitial spaces which occur. Epoxy-type resins are also useful. Preferably resins of low viscosity are used to which a plasticizer is added in order to provide the required flexibility and body. Such resins can readily absorb expansion of the winding, or local deformation which may occur when the rotor turns at high speed, or upon sudden reversal of the direction of rotation of the machine, without risk of breaking or being subject to fissures.

In order to harden such resins, various methods to obtain cross linking may be used, which are well known by themselves. For example, one may use hardeners such as acid anhydrides. Preferably, a hardener is used which will give the final composition good thermal stability and a useful life compatible with the life of the entire machine.

The resin used may contain mineral additives, such as silicon, slate powder, talc, alumina, silicates, or zirconium oxides. The following composition is suitable:

Epoxy resin, index 5.1—5.5 — 100 parts (per weight)
Epoxy resin, index 2.2—2.5 — 30 parts (per weight)

(FLEXIBLE LONG-CHAIN RESINS)

Hardener, based on carboxylic anhydrides — 115 parts (per weight)
Accelerator (a complex tertiary amine) — 1 part (per weight)
Powdered silicon — — — 250 parts (per weight)

The resin used for impregnation may also, of course, be based on polyesters or on silicones.

Figure 4:
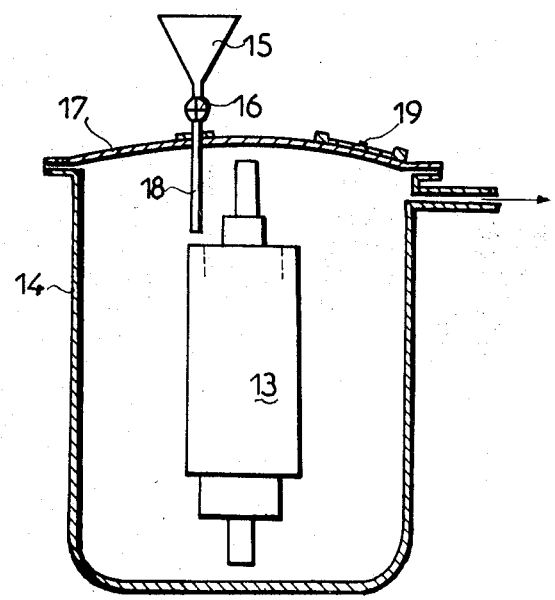
FIG. 4 is a schematic representation of apparatus to introduce insulation material, under vacuum to insulate the rotor structure.

FIG. 4 illustrates an apparatus useful for introducing insulation under vacuum. Rotor assembly 13 is preferably preheated in a preheat chamber to a temperature of from 80 to 100 C., and placed vertical by means of holders (not shown) with the commutator at the bottom within vacuum tank 14. Vacuum tank 14 is evacuated as schematically indicated. Supply funnel 15, controlled by a valve 16, passes through cover 17 of tank 14. Synthetic resin, carefully mixed and degassed, is slowly introduced through funnel 15 into tube 18, which is placed to direct the liquid insulating material in the space between rings 7 and 8 (FIG. 1, FIG. 3). An observation port 19, for example glass covered, enables checking on the operation. When the rotor is entirely impregnated, valve 16 is closed and the tank is kept under vacuum for a certain period of time, for example an hour. After the vacuum tank has been opened, so that the assembly is again subjected to atmospheric pressure, the rotor is placed into another tank so that the resin may polymerize.

Figure 5:
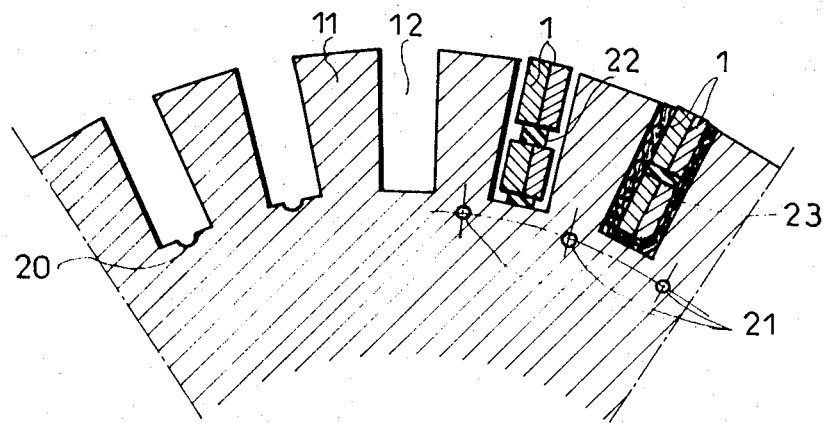
FIG. 5 is a transverse cross-sectional partial view illustrating flow channels for liquid thermosetting synthetic resin.

FIG. 5 illustrates a modification of the present invention, in which the distribution of the liquid resin is improved. A plurality of longitudinal channels, or ducts are formed in the rotor. Semicircular grooves 20 are formed in the bottom of the slots 12; additionally, the magnetic laminations 11 may be pierced by holes 21, located at the base of the teeth. The groups of conductors 1, themselves, may be spaced from each other, and from the bottom of the slots 12 by spacer members 22, of smaller size than the width of the slots themselves; the walls themselves may be lined with an insulator, for example embossed or corrugated as seen at 23. Both spacers 22 and insulator 23 may be used, or the one or the other element omitted, as desired by the designer. In the drawing, only one slot is shown with one insulation means, separately, for ease of illustration.

Figure 6:
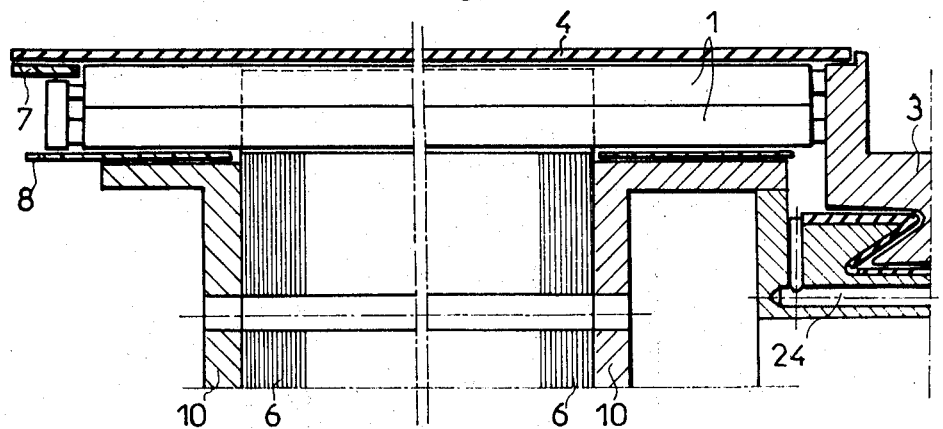
FIG. 6 is a partial longitudinal cross-sectional view of a rotor with internal injection ducts.
Figure 7:
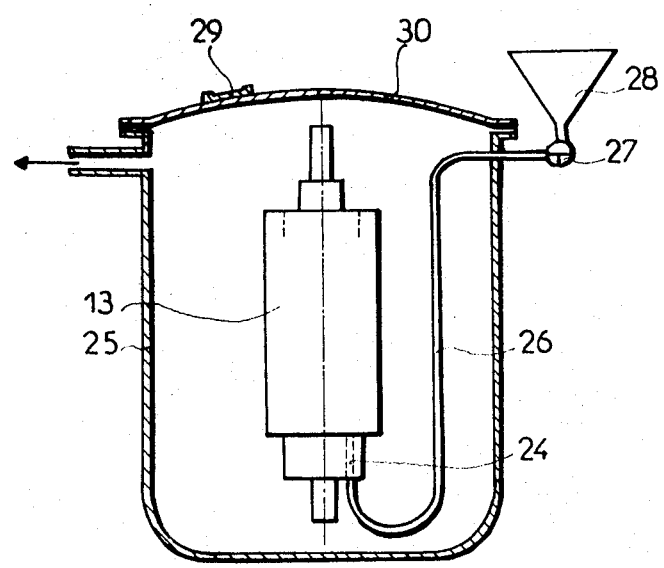
FIG. 7 is a schematic representation of apparatus to introduce liquid resin into a rotor of the structure of FIG. 6.

Distribution of thermosetting resin without solvent is best accomplished by introducing the resin through an orifice drilled into one end of the rotor. Referring now to FIG. 6, duct 24 is formed longitudinally in the rotor drum, and connects with a transverse extension to provide for flow of material beneath jacket 4. This supply duct is independent of ventilation holes which may be formed in the rotor, and which are not shown in the drawing for ease of illustration, and to prevent confusion. A rotor which has such a supply duct can be impregnated with insulation in apparatus illustrated in FIG. 7. Rotor 13 is placed inside a tank 25, which is evacuated. Tube 26 is connected to the orifice of rotor 13 and resin is introduced through supply hopper 28 and permitted to enter over valve 27. Observation opening 29 is provided so that the impregnation can be checked. As soon as resin is found to appear at the top side of the rotor (FIG. 7) indicating that the entire windings have been impregnated and all interstitial spaces or openings or voids have been filled with resin, valve 27 is closed. When impregnation is complete, the rotor can be removed from the tank, which is preferably heated in order to keep the thermosetting material in highly liquid state, and the thermosetting resin is permitted to cool and polymerize.

The jacket 4, of textile or other nonmagnetic material thus provides at the same time a mechanically strong outer cover and the outer jacket for a mold, so that a vacuum tight mold otherwise surrounding only the motor structure can be avoided.

I claim:
1. Rotor for dynamo-electric machines having a magnetic structure with slots therein comprising:
    windings located within said slots;
    hardened insulating material located in said slots and surrounding said windings, filling all interstitial spaces and separating and insulating said windings in said slots; and
    a thin jacket formed of closely wrapped glass fiber strandlike material closing off said slots and extending over the length of the winding and covering said magnetic structure, said glass fiber strandlike material being impregnated with said insulating material filling said interstitial spaces in set, hardened condition.

2. Rotor for dynamo-electric machines having a magnetic structure with slots therein comprising:
    winding located within said slots;
    hardened insulating material located in said slots and surrounding said windings, filling all interstitial spaces and separating and insulating said windings in said slots; and
    a thin jacket formed of closely wrapped nonmagnetic steel wires, covered with a thin insulating tape, closing off said slots and impregnated with said insulating material in set, hardened condition.